No. 650,267. Patented May 22, 1900.
N. P. NIELSEN & J. L. MURPHY.
COMBINATION LOCK.
(Application filed Feb. 14, 1900.)
(No Model.)
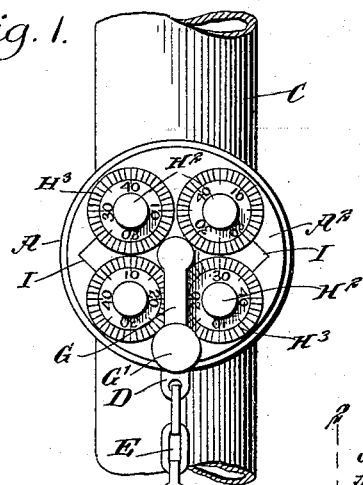
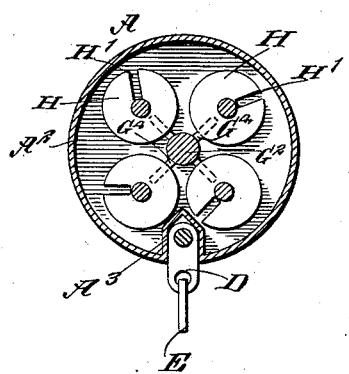
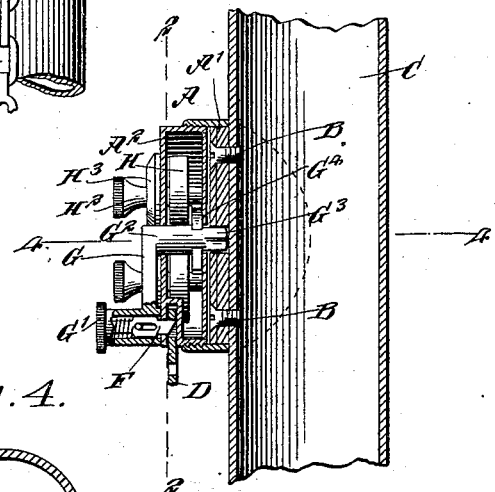
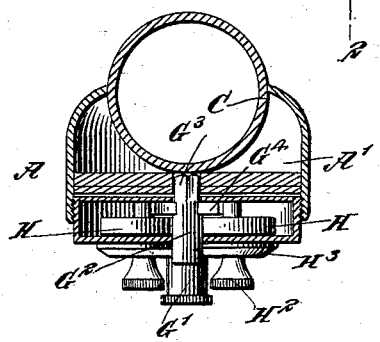
WITNESSES:
INVENTORS
Niels Peter Nielsen.
Junius L. Murphy.
BY
ATTORNEYS

UNITED STATES PATENT OFFICE.

NIELS PETER NIELSEN AND JUNIUS L. MURPHY, OF DENVER, COLORADO.

COMBINATION-LOCK.

SPECIFICATION forming part of Letters Patent No. 650,267, dated May 22, 1900.

Application filed February 14, 1900. Serial No. 5,219. (No model.)

*To all whom it may concern:*

Be it known that we, NIELS PETER NIELSEN and JUNIUS L. MURPHY, citizens of the United States, and residents of Denver, in the county of Arapahoe and State of Colorado, have invented a new and Improved Combination-Lock, of which the following is a full, clear, and exact description.

The object of the invention is to provide a new and improved combination-lock designed for use on bicycles and other machines, devices, and articles and arranged to protect the owner of the article from theft both by locking a movable part against movement and by rendering the removal of the entire lock impossible without leaving traces on the article, so that the stolen article may be readily identified.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a front view of the improvement as applied to a bicycle-frame. Fig. 2 is a sectional front view of the same on the line 2 2 in Fig. 3. Fig. 3 is a transverse section of the same, and Fig. 4 is a sectional plan view of the same on the line 4 4 in Fig. 3.

The improved combination-lock is mounted in a suitably-constructed casing A, preferably made in two parts $A'$ $A^2$, screwed or otherwise fastened together, the inner part $A'$ being fastened by solder or screws B or other devices to a part of the bicycle-frame C or other member of the article on which the combination-lock is to be used. In the part $A^2$ is formed a recess $A^3$ for the reception of a keeper D, held on one end of a chain E, secured to a part of the bicycle-frame and passed through or around a movable part of the bicycle to then engage with the keeper D of the combination-lock, so as to hold said movable member against movement as long as the keeper D is engaged by the combination-lock. For this purpose the aperture in the keeper D is adapted to be engaged by a spring-pressed catch F, mounted to slide in the offset $G'$ of a bolt G, having a shank $G^2$ extending transversely in the casing, the extreme inner end $G^3$ of the shank being made polygonal to engage a correspondingly-shaped aperture in the bottom or base of the casing part $A'$.

On the shank $G^2$ of the bolt G, within the casing part $A^2$, are formed arms $G^4$, adapted to engage slots $H'$, formed in tumbler-disks H, mounted to turn in the casing part $A^2$, a knob $H^2$ being on the outer ends of the tumbler-disk shafts to allow the operator to conveniently set the tumbler-disks according to the desired combination indicated by the index-plate $H^3$ on a graduation-mark I, formed on the face of the casing part $A^2$, it being understood that the index-plates $H^3$ are of the usual construction and secured on the shaft or knob $H^2$ of the tumbler-disks. When the slots $H'$ are out of alinement with the arms $H^4$ and the catch F is in engagement with the keeper D to hold a movable member of the bicycle against movement, then an unauthorized person cannot unlock the chain E, as the keeper D is securely locked in position by the spring-catch F, contained in the bolt G, and held against outward movement by the arms $G^4$, abutting against the inner faces of the tumbler-disks H.

In order to remove the keeper D, it is necessary to slide the bolt G outward, so that the spring-catch F is moved out of engagement with the keeper D, and for this purpose it is necessary that the knobs $H^2$ be turned to the desired combination indicated on the marks I—that is, until the slots $H'$ register with the arms $G^4$—to permit an outward sliding of the bolt G the arms passing into the said slots $H'$. Now when the bolt is moved into this outermost position the catch F is disengaged from the keeper D and the latter is removed from the recess $A^3$ to allow of removing the chain E from the movable member of the bicycle. Thus unless a person knows the combination he cannot turn the disk to the proper position—that is, to bring the slots in register with the arms and allow an outward-sliding movement of the bolt for unlocking the keeper D. It will further be seen that by securing the lock to the bicycle-frame a removal of the lock from the frame by unauthorized persons will leave identification marks or traces which will enable the original owner to readily identify the machine.

Having thus fully described our invention, we claim as new and desire to secure by Letters Patent—

1. A combination-lock, comprising a casing adapted to be secured to the article to be protected, slotted tumbler-disks mounted to turn in said casing and having external setting-knobs, a bolt mounted to slide in said casing and having arms for engagement with the disks, and a spring-pressed catch held in said bolt and adapted to engage a keeper, substantially as described.

2. A combination-lock, comprising a casing secured to the article to be protected, the said casing having a recess formed therein for the reception of a keeper, slotted tumbler-disks mounted to turn in said casing, a sliding bolt having a shank extending within the casing, arms on the shank of the bolt and adapted to abut against the inner face of said disks to hold the bolt against outward movement, or to engage the slots therein when the disks are in proper position, to permit said outward sliding of the bolt, and a locking-catch carried by an offset of said bolt for engagement with the keeper, substantially as shown and described.

3. A combination-lock, comprising a casing made in parts removably connected with each other, and of which one part is secured to the article to be protected, slotted tumbler-disks mounted to turn in the casing, and having external setting-knobs and index-disks, a bolt mounted to slide in said casing, and having arms for engagement with and for abutting against said disks, and for engaging the slots therein when the disks are in proper position, and a spring-pressed catch held in said bolt and adapted to engage a keeper, substantially as shown and described.

In testimony whereof we have signed our names to this specification in the presence of two subscribing witnesses.

NIELS PETER NIELSEN.
JUNIUS L. MURPHY.

Witnesses:
F. A. FOSTER,
H. T. HIGGINS.